United States Patent
Hall et al.

(10) Patent No.: US 8,153,238 B2
(45) Date of Patent: Apr. 10, 2012

(54) STRETCH BONDED LAMINATE INCLUDING AN ELASTIC MEMBER CONTAINING AN ADHESIVE COMPOSITION

(75) Inventors: Gregory K. Hall, Menasha, WI (US);
Peiguang Zhou, Appleton, WI (US);
Xiaomin Zhang, Appleton, WI (US);
Daniel Wideman, Menasha, WI (US);
Thomas Vercauteren, Greenville, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 579 days.

(21) Appl. No.: 11/302,990

(22) Filed: Dec. 14, 2005

(65) Prior Publication Data

US 2007/0135008 A1 Jun. 14, 2007

(51) Int. Cl.
*B32B 27/06* (2006.01)
(52) U.S. Cl. ............... 428/195.1; 428/196; 442/328; 442/329; 442/366; 442/400; 442/401
(58) Field of Classification Search .............. 442/328, 442/329, 366, 400, 401; 428/195.1, 196
See application file for complete search history.

(56) References Cited

U.S. PATENT DOCUMENTS

| | | | |
|---|---|---|---|
| 3,692,618 A | 9/1972 | Dorschner et al. | |
| 3,849,241 A | 11/1974 | Butin et al. | |
| 4,340,563 A | 7/1982 | Appel et al. | |
| 4,720,415 A | 1/1988 | Vander Wielen et al. | |
| 4,857,594 A * | 8/1989 | Lakshmanan et al. | 525/98 |
| 5,385,775 A | 1/1995 | Wright | |
| 6,057,024 A | 5/2000 | Mleziva et al. | |
| 6,657,009 B2 | 12/2003 | Zhou | |
| 6,774,069 B2 | 8/2004 | Zhou et al. | |
| 6,969,441 B2 | 11/2005 | Welch et al. | |
| 2002/0119722 A1 | 8/2002 | Welch et al. | |
| 2003/0124331 A1* | 7/2003 | Morell et al. | 428/297.4 |
| 2004/0121690 A1 | 6/2004 | Mleziva et al. | |
| 2004/0123938 A1 | 7/2004 | Neculescu et al. | |
| 2005/0054779 A1 | 3/2005 | Zhou | |
| 2005/0054780 A1 | 3/2005 | Zhou et al. | |
| 2005/0148263 A1 | 7/2005 | Zhou et al. | |

FOREIGN PATENT DOCUMENTS

| | | |
|---|---|---|
| WO | WO 0188245 A2 | 11/2001 |
| WO | WO 0188245 A3 | 11/2001 |
| WO | WO02053668 A2 * | 7/2002 |

OTHER PUBLICATIONS

Search Report and Written Opinion for PCT/US2006/025779, Dec. 6, 2006.

(Continued)

*Primary Examiner* — Elizabeth Cole
(74) *Attorney, Agent, or Firm* — Dority & Manning, P.A.

(57) ABSTRACT

Elastic composite laminates are disclosed. The laminates include an elastic member bonded to at least one facing material. In accordance with the present disclosure, an adhesive composition is coextruded with an elastomeric material to form the elastic member. In this manner, the elastic member can be bonded to the facing material in a stretched state without having to apply a separate adhesive layer between the two materials. In one embodiment, the elastic member can be bonded to the facing material according to a pattern that includes bonded areas and non-bonded areas.

38 Claims, 6 Drawing Sheets

OTHER PUBLICATIONS

ASTM Designation: D 1238-95 entitled "Standard Test Method for Flow Rates of Thermoplastics by Extrusion Plastometer", Nov. 10, 1995, pp. 273-281.

ASTM Designation: D 1238-70 entitled "Standard Method of Measuring Flow Rates of Thermoplastics by Extrusion Plastometer", Jun. 12, 1970, pp. 415-426.

ASTM Designation No. D 2240-97 entitled "Standard Test Method for Rubber Property—Durometer Hardness", Feb. 10, 1997, pp. 400-403.

ASTM Designation No. D 3236-88 entitled "Standard Test Method for Apparent Viscosity of Hot Melt Adhesives and Coating Materials", Oct. 31, 1988, pp. 631-637.

* cited by examiner

STRETCH BONDED LAMINATE INCLUDING AN ELASTIC MEMBER CONTAINING AN ADHESIVE COMPOSITION

BACKGROUND OF THE INVENTION

Articles requiring a degree of elasticity have been formed by combining elastic materials with inelastic, or less elastic, materials through various lamination processes. Often, such composite laminate articles will be stretchable because of the presence of the elastic material and the particular manner in which the elastic and inelastic materials have been bonded together during the laminating process.

Typically, such stretchable laminates are formed by joining the inelastic material to the elastic material while the elastic material or sheet is in a stretched condition. After such joining of the materials, the laminated article is then allowed to relax, which results in the inelastic component gathering in the spaces between bonding sites on the elastic sheet. The resulting laminate article is then stretchable to the extent that the inelastic material gathered between the bond locations allows the elastic material to elongate. Examples of these types of composite laminate articles and materials are set forth in U.S. Pat. Nos. 4,720,415 and 5,385,775, each of which is incorporated herein by reference thereto.

In some stretchable laminate articles, elastic strands of continuous filaments are bonded to relatively inelastic sheet materials while the elastic strands are in a stretched condition. Such elastic continuous filaments may, in certain articles, be sandwiched between two or more relatively inelastic sheets. The relatively inelastic sheets may include nonwoven webs formed by meltblowing or spunbonding various polymers. Examples of such laminates are shown in U.S. Pat. No. 5,385,775; in U.S. Pat. No. 6,057,024; and in U.S. Published Patent Application No. U.S. 2002/0104608, which are all incorporated herein by reference.

In the past, an adhesive was used in order to adhere the elastic strands of continuous filaments to the sheet materials. In one embodiment, for instance, the adhesive was sprayed on the sheet material prior to contacting the filaments forming an adhesive layer in between the sheet material and the filaments. Spraying the adhesive material onto the sheet materials, however, may have some drawbacks in various applications. For instance, spray devices may be difficult to control leading to over-application of the adhesive or leading to a non-uniform coverage of the adhesive on the sheet material, especially at high machine speeds and at low application rates. In fact, over-application of a hot adhesive during a spray process may cause filament breakage and machine downtime. Further, since the adhesive has to travel a distance prior to contacting the sheet material, the adhesives may experience a loss in tack prior to contacting the sheet material.

In view of the above, a need currently exists for an improved method for bonding an elastic member to a facing material. A need also exists for an elastic composite laminate that has improved properties and/or characteristics due to the manner in which the layers are combined together.

SUMMARY OF THE INVENTION

In general, the present disclosure is directed to composite elastic materials that include an elastic member bonded to at least one facing material, such as a nonwoven web. The facing material can be laminated to the elastic member when the elastic member is in a stretched state. Thus, when the elastic member is relaxed, the facing material gathers and allows the entire composite to stretch in at least one direction.

In accordance with the present disclosure, the elastic member comprises an elastomeric material combined with an adhesive composition. For instance, the elastomeric material and the adhesive composition may be coextruded together in forming the elastic member. Once the adhesive composition and the elastomeric material are coextruded together, the adhesive composition migrates to or is otherwise located on a surface of the elastic member and is then used to bond the elastic member to the facing material. In this manner, if desired, the elastic member can be bonded to the facing material without any additional adhesive layer present in between the elastic member and the facing material. Thus, in comparison to conventional composite laminates, an entire layer of the final product is eliminated.

In general, any suitable adhesive composition capable of being combined with an elastomeric material may be used. The adhesive composition may be formulated to create an elastic member that is tacky or that is non-tacky. Based upon the adhesive composition and the process conditions, the manner in which the elastic member is attached to the facing material can also vary depending upon the particular application. For instance, in one embodiment, the elastic member and the facing material may be bonded together through pressure, such as by being fed together through a nip. Alternatively, especially if the elastic member is non-tacky, a suitable form of energy may be used in order to bond the two materials together. For instance, the elastic member may be thermally bonded or ultrasonically bonded to the facing material. In one particular embodiment, the facing material and the elastic member may be fed through heated embossing rollers for attaching the two layers together.

In one particular embodiment, the elastic member may be bonded to the facing material according to a pattern that forms bonded areas and non-bonded areas. By forming bonded areas and non-bonded areas, the stretch characteristics and/or the stiffness properties of the composite material can be controlled. In general, any suitable pattern may be used in order to bond the elastic member to the facing material. For instance, from about 10% to about 80% of the surface area of the elastic member may be bonded to the facing material, such as from about 20% to about 60% of the surface area, such as from about 35% to about 45% of the surface area. In one particular embodiment, the bonding pattern may comprise parallel bond lines perpendicular to the elastic filament axes, or in the cross machine direction. In this embodiment, the facing material can have a corrugated appearance after bonding.

As stated above, the adhesive composition can vary depending upon the particular application. In one particular embodiment, the adhesive composition may contain an atactic polymer, a crystalline polymer, and a tackifier. The atactic polymer may comprise a polypropylene, a polystyrene, a polybutene, a low density polyethyelene, or a polyalphaolefin random copolymer. The crystalline polymer, on the other hand, may comprise a similar polymer having greater crystallinity. For instance, the atactic polymer may be less than about 25% crystalline, such as less than about 20% crystalline, while the crystalline polymer may be greater than about 60% crystalline, such as greater than about 80% crystalline.

The tackifier, on the other hand, may comprise a hydrocarbon. The tackifier may be present in the adhesive composition in an amount from about 20% to about 60% by weight, such as from about 30% to about 50% by weight.

In one embodiment, the adhesive composition may further comprise an extensible polymer. The extensible polymer may comprise a material selected from the group consisting of styrene-isoprene-styrene block copolymers, styrene-butadiene-styrene block copolymers, styrene-ethylene butylene-styrene block copolymers, styrene-ethylene propylene-styrene block copolymers, single-site catalyzed polyolefins, polyisoprenes, polybutadienes, ethylene vinyl acetate copolymers, ethylene methacrylate copolymers, ethylene n-butyl acrylate copolymers, and combinations thereof.

The elastic member may comprise, for instance, a film, a plurality of fibers, a plurality of filaments, or a non-woven web. The elastomeric polymer contained in the elastic member may comprise a styrenic block copolymer, a polyurethane, a polyester, a polyamide, a copolymer of ethylene and at least one vinyl monomer, or a metallocene-catalyzed polyolefin.

As described above, the elastic member is bonded to a facing material. The facing material may comprise any suitable textile material, such as a non-woven material, a woven material, a knitted material, and the like. In one embodiment, the elastic member may be bonded to a first facing material on one side and to a second facing material on an opposite side. The elastic member may be attached to the one or more facing materials in a stretched state such that the facing materials gather when the elastic member is relaxed.

As described above, the elastic member can be produced so as to be tacky or non-tacky. When the elastic member is attached to only one facing material, for instance, it may be desirable to produce the elastic member to be non-tacky. In this manner, the product can be wound, unwound and can be processed through various different converting operations without the product adhering to itself or to the equipment.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Repeat use of reference characters in the present specification and drawings is intended to represent the same or analogous features or elements of the present invention.

DEFINITIONS

The term "continuous filaments", as used herein, refers to strands of continuously formed polymeric filaments. Such filaments will typically be formed by extruding molten material through a die head having a certain type and arrangement of capillary holes therein.

The term "elastic" or "elasticized", as used herein, refers to a material which, upon application of a biasing force, is stretchable, which is elongatable to at least about 60 percent (i.e., to a stretched, biased length which is at least about 160 percent of its relaxed unbiased length), and which will recover at least 55 percent of its elongation upon release of the stretching force. A hypothetical example of an elastic material would be a one (1) inch sample of a material which is elongatable to at least 1.60 inches and which, when released, will recover to a length of not more than 1.27 inches. Many elastic materials may be elongated by more than 60 percent (i.e., more than 160 percent of their relaxed length). For example, some elastic material may be elongated 100 percent or more, and many of these will recover to substantially their initial relaxed length such as, for example, within 105 percent of their original relaxed length upon release of the stretching force.

The term "composite nonwoven fabric", "composite nonwoven", "laminate", or "nonwoven laminate", as used herein, unless otherwise defined, refers to a material having at least one elastic material joined to at least one sheet material. In most embodiments such laminates or composite fabric will have a gatherable layer which is bonded to an elastic layer or material so that the gatherable layer may be gathered between bonding locations. As set forth herein, the composite elastic laminate may be stretched to the extent that the gatherable material gathered between the bond locations allows the elastic material to elongate. This type of composite elastic laminate is disclosed, for example, in U.S. Pat. No. 4,720,415 to Vander Wielen et al., which is incorporated herein in its entirety by reference thereto.

As used herein, the term "nonwoven web" refers to a web having a structure of individual fibers or threads that are interlaid, but not in an identifiable, repeating manner. Nonwoven webs have been, in the past, formed by a variety of processes such as, for example, meltblowing processes, spunbonding processes and bonded carded web processes.

As used herein, the term "meltblown fibers" means fibers formed by extruding a molten thermoplastic material through a plurality of fine, usually circular, die capillaries as molten thermoplastic material or filaments into a high velocity gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, U.S. Pat. No. 3,849,241 to Butin, which is incorporated herein in its entirety by reference thereto.

As used herein, the term "spunbonded fibers" refers to small diameter fibers formed by extruding a molten thermoplastic material as filaments from a plurality of fine, usually circular, capillaries of a spinerette with the diameter of the extruded filaments then being rapidly reduced as by, for example, eductive stretching or other well-known spunbonding mechanisms. The production of spun-bonded nonwoven webs is illustrated in patents such as, for example, U.S. Pat. No. 4,340,563 to Appel et al., and U.S. Pat. No. 3,692,618 to Dorschner et al. The disclosures of these patents are incorporated herein in their entireties by reference thereto.

As used herein, the term "coextruded" includes any manner in which different components can be extruded together including preblended, masterbatched, pelletized or down barrel (downstream) dosing, and even multilayer channeled mix block and die head extruding.

As used herein, the term "machine direction" (MD) refers to the direction along which the product is produced, such as the direction by which the elastic member is extruded. As used herein, the term "cross-machine direction" (CD) refers to a direction that is substantially perpendicular to the machine direction and substantially perpendicular to the direction in which the process line operates.

DETAILED DESCRIPTION

It is to be understood by one of ordinary skill in the art that the present discussion is a description of exemplary embodiments only, and is not intended as limiting the broader aspects of the present invention.

The present disclosure is generally directed to a method for producing a composite elastic material and to the material itself. More particularly, the present disclosure is directed to combining an adhesive composition with an elastomeric material in order to form an elastic member. The adhesive composition contained within the elastic member is then used to bond the elastic member to at least one facing material. For instance, the elastic member can be laminated to a facing material in a stretched state such that, when the elastic member relaxes, the facing material gathers forming a laminate that has elastic properties in at least one direction.

In the past, elastic components, such as elastic filaments, have been laminated to facing materials by spraying an adhesive onto the facing material. By incorporating an adhesive composition directly into an elastic member, on the other hand, a separate adhesive layer may be completely eliminated from the product if desired. Thus, the process for producing the elastic composite materials can be simplified.

In addition, the present inventors have discovered that products made according to the present disclosure provide other various benefits and advantages in comparison to conventional materials. For instance, in the past, the adhesive layer typically was applied to completely cover one side of the facing material. In addition to increasing process complexity and cost, covering the facing material with an adhesive may cause stiffness and loss of flexibility. The adhesive material may also unfavorably impact upon the appearance of the product and cause a reduction in elastic efficiency. Products made according to the present disclosure, however, may have improved elastic efficiency, may have improved softness and stiffness properties, and may have better breathability properties, especially when used in the construction of absorbent articles, such as diapers, adult incontinence products, training pants, and feminine hygiene products.

In one particular embodiment, the elastic member can be bonded to one or more facing materials according to a particular pattern that forms bonded areas and non-bonded areas. In particular, since the adhesive composition is integral with the elastic member, the elastic member can be bonded to a facing material at any particular location by supplying the proper amount of energy. Bonding the elastic member to the facing material according to a pattern can also provide various benefits and advantages. For instance, the resulting product may have greater flexibility and softness. Bonding the elastic member to the facing material according to a pattern can also produce a product having a unique and aesthetic appearance.

For exemplary purposes only, processes that may be used in order to create elastic composite materials in accordance with the present disclosure will be described with particular reference to FIGS. 1-5. In the embodiments illustrated, the elastic member comprises a plurality of elastic filaments that are bonded to facing materials while in a parallel relationship. It should be understood, however, that the elastic member may come within different shapes and forms without departing from the scope of the present disclosure. For example, in other embodiments, the elastic member may comprise a film, may comprise elastic fibers, may comprise a nonwoven web, or the like.

Figure 1:
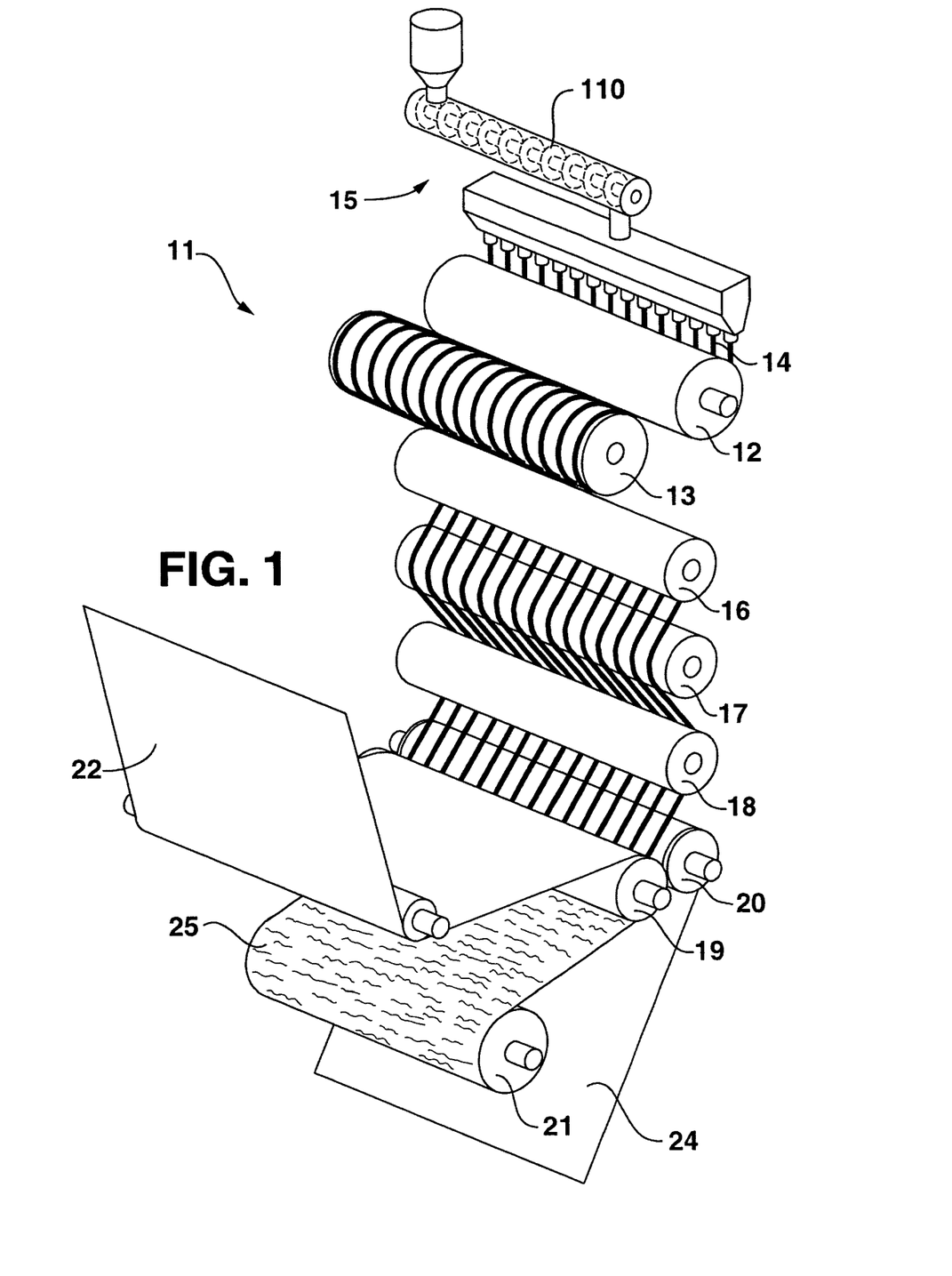
FIG. 1 is a perspective view of one embodiment of a process for producing composite nonwoven materials in accordance with the present invention.
Figure 2:
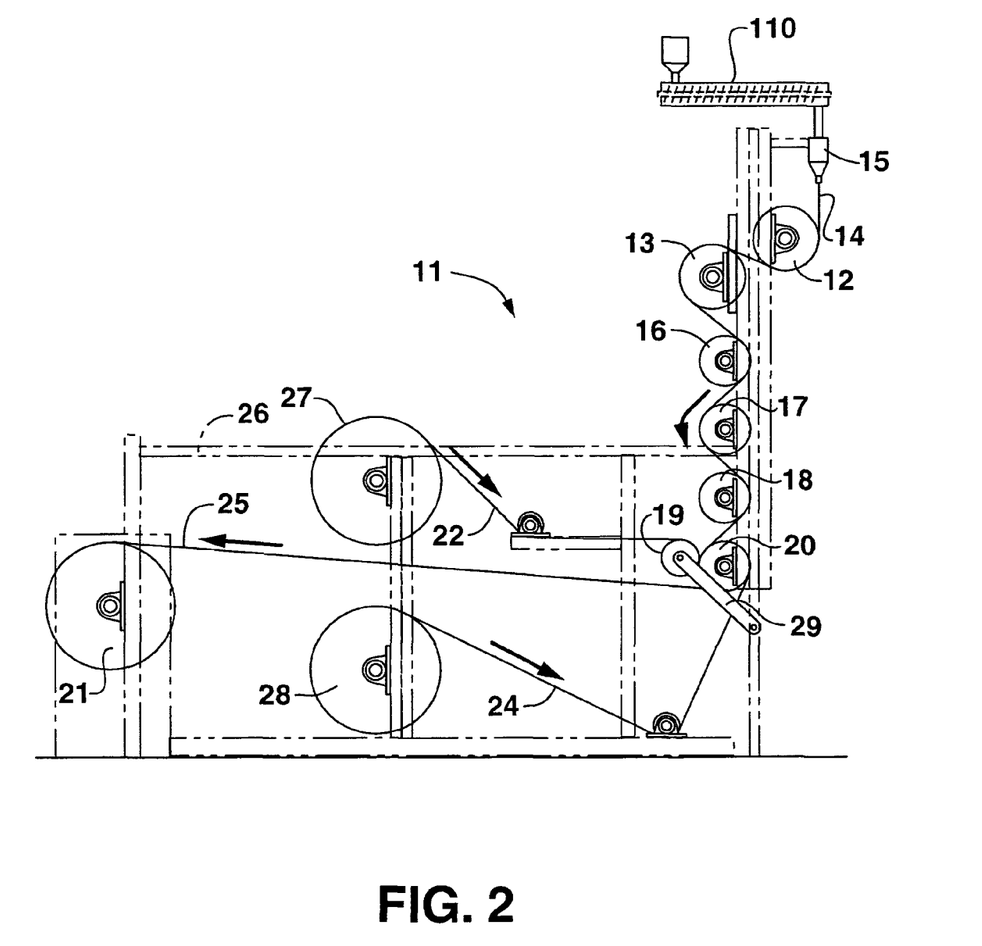
FIG. 2 is a side view of the system and process illustrated in FIG. 1.
Figure 3:
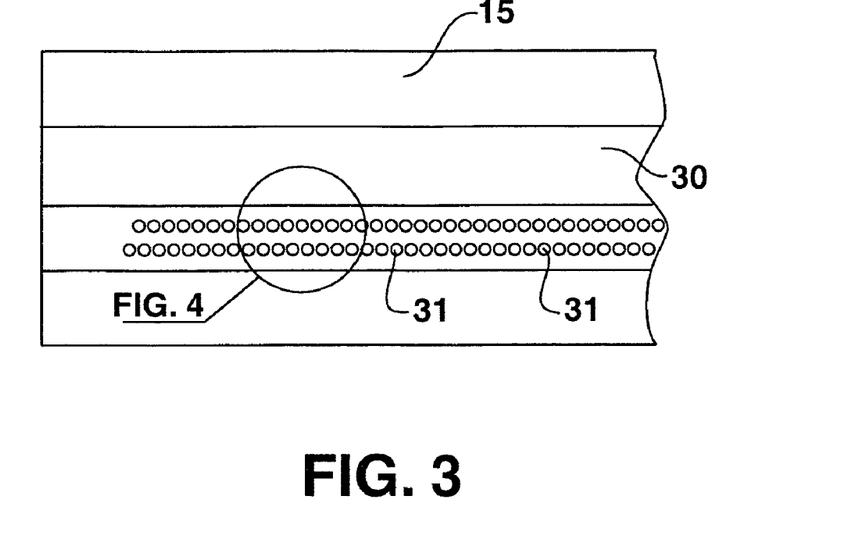
FIG. 3 is a partial view of an extrusion surface of an exemplary extruder head for extruding elastic continuous filaments.

Referring to FIGS. 1 and 2, one exemplary system and process for producing laminates in accordance with the present disclosure is illustrated. In the embodiment shown in FIG. 1, the system may be considered a vertical filament lamination (hereinafter "VFL") system since the elastic filaments are formed and stretched in a vertical arrangement. It should be understood, however, that the process of the present invention may be configured in a horizontal system in which the filaments are cooled and stretched in a horizontal direction. One embodiment of a horizontal system, for instance, is illustrated in FIGS. 1 and 2 of U.S. Pat. No. 6,057,024, which is incorporated herein by reference.

As shown in FIG. 1, the VFL system 11 is vertically configured. An extruder 10 is mounted for extruding continuous molten filaments 14 downward from an extrusion die 15 at a canted angle onto chilled positioning roller 12. Chilled positioning roller 12 ensures proper alignment through the remainder of the system as it spreads the filaments. As the filaments travel over the surface of chilled positioning roller 12, they are cooled and solidified as they travel towards and over the chilled surface of chilled roller 13. The filaments then travel downward in an "s-shaped" progression to a roller 16 and then across the surface of a roller 17, a roller 18 and into the nip formed by nip roller 19 and nip roller 20.

The continuous filaments 14 formed in the process may have any desirable shape. In one embodiment, for instance, the filaments may have a ribbon-like shape. For instance, the filaments may have a width of from about 0.5 mm to about 1.5 mm in an unstretched state. The filaments all generally extend in the same direction and are generally parallel to each other. The actual number of continuous filaments utilized in any particular process may vary depending upon the particular characteristics desired in the final product. For example, the array of filaments may total more than about 100 strands, such as more than about 200 separate strands. For example, in one embodiment, the array of filaments may number from about 200 separate strands to as much as 2600 separate strands. A greater or lesser number of strands, however, is also possible.

As shown in FIG. 1, the extrusion die 15 may be positioned with respect to the first roller 12 so that the continuous filaments meet the first roller at a predetermined angle. In some embodiments, an angled, or canted, orientation provides an opportunity for the filaments to emerge from the die at an angle to the roll tangent point resulting in improved spinning, more efficient energy transfer, and generally longer die life. This configuration allows the filaments to emerge from the die and follow a relatively straight path to contact the tangent point on the roll surface. The angle between the die exit of the extruder and the vertical axis may be as little as a few degrees or as much as 90°. For example, the angle may be about 20°, about 35°, or about 45° away from vertical.

In accordance with the present disclosure, the continuous filaments are formed from the combination of an elastomeric material and an adhesive composition. The elastomeric material and the adhesive composition can be combined together in any suitable manner so that both components are present in the resulting filaments. In one embodiment, the two materials can be coextruded together. For instance, the elastomeric material and the adhesive composition may be combined together and fed to the extruder 10. For example, both materials may be fed to the extruder 10 in the form of polymeric beads or pellets.

In an alternative embodiment, the elastomeric material and the adhesive composition may be compounded together and formed into polymeric beads or pellets that are then fed to the extruder 10.

When fed to the extruder 10 as separate components, the elastomeric material and the adhesive composition can be combined together at any suitable point during the length of the extruder. For instance, both materials may be fed directly into the same hopper that then leads into the extrusion die 15. Alternatively, one material may be fed downstream in the extruder from the other material. For example, the adhesive composition may be fed downstream from the elastomeric material. Feeding the adhesive composition downstream from the elastomeric material may cause greater amounts of the adhesive composition to migrate to the surface of the filaments as will be described in more detail below.

In general, the elastomeric material may comprise any suitable material with the desired elastic properties. For example, a Kraton® brand elastic polymer may be fed into an extruder where the polymer is melted at a controlled temperature of between about 125° C. and 240° C., and in certain instances at about 200° C. In other embodiments, depending on the particular polymer employed, the melt temperature may be approximately 240° C. to 260° C. The polymer is then extruded through a predetermined number of apertures in a die head in a generally downward direction into separate continuous filaments at a pressure of approximately 300 to 4000 psi (typically from about 1500 to about 2000 psi). As explained below, various die hole configurations may be utilized in the present disclosure.

One particular class of polymers that may be utilized in the present process is the Kratone® G series of polymers distributed by Kraton Polymers LLC of Houston, Tex. Various Kraton® polymers may be utilized. Other styrenic block copolymers that may be used include, for instance, the Kraton® D series polymers, SIS and SBS polymers available from Dexco, and KURARAY SEPS polymers available from Septon.

However, the present disclosure is not limited to this or any particular polymer or material from which to form the elastic member. For example, various materials, including the following, may be used: polypropylene, polyethylene, polyesters, polyethylene terephthalate, polybutane, polymethyldentene, ethylenepropylene co-polymers, polyamides, tetrablock polymers, styrenic block copolymers, polyhexamethylene adipamide, poly-(oc-caproamide), polyhexamethyleneseba-camide, polyvinyls, polystyrene, polyurethanes, thermoplastic polymers, polytrifluorochloroethylene, ethylene vinyl acetate polymers, polyetheresters, polyurethane, polyurethane elastomerics, polyamide elastomerics, polyamides, viscoelastic hot melt pressure sensitive adhesives, cotton, rayon, hemp and nylon. In addition, such materials may be utilized to extrude single-constituent, bi-constituent, and bi-component filaments within the scope of the presently described invention.

Other exemplary elastomeric materials that may be used include polyurethane elastomeric materials such as those available under the trademark ESTANE from Noveon, Inc of Cleveland, Ohio, polyamide elastomeric materials such as those available under the trademark PEBAX from the Atofina Chemicals, Inc. of Philadelphia, Pa., a thermoplastic polyurethane such as ELASTOLLAN polymer from BASF Corp. of Florham Park, N.J.; and polyester elastomeric materials such as those available under trade designation HYTREL from E. I. DuPont De Nemours & Company.

However, the invention is not limited to only such elastomeric materials. For example, various latent elastic materials such as the Arnitel-brand polymers available from DSM Engineering Plastics, Inc. of Evansville, Ind. may be utilized to provide the necessary elasticity characteristics to the continuous filaments.

The adhesive composition, on the other hand, can comprise any suitable material that, once combined with the elastomeric material, can form bonds between the elastic member, such as the continuous filaments, and one or more facing materials. For example, the adhesive composition may contain a thermoplastic polymer that, once combined with the elastomeric material, is available to bond the elastic member to a facing through the application of heat, pressure or any other suitable energy without substantially adversely affecting the elastic properties of the elastomeric material. An adhesive composition may be selected that renders the elastic member tacky or non-tacky depending upon the particular application and the desired result.

In one particular embodiment, the adhesive composition comprises a blend of an atactic polymer, a crystalline polymer, a tackifier, and optionally an extensible polymer. The adhesive composition may also include other additives such as an oxidizing agent, a plasticizer, a color pigment, and the like.

In one embodiment, the atactic or substantially amorphous polymer may be present in the adhesive composition in an amount from about 20% to about 80% by weight, such as from about 40% to about 60% by weight, such as from about 45% to about 55% by weight. The crystalline polymer, on the other hand, may be present in the adhesive composition in an amount up to about 30% by weight, such as from about 5% to about 25% by weight, such as from about 10% to about 20% by weight. The amount of tackifier present in the adhesive composition may vary depending upon various factors including the amount of tackiness the composition should have. In general, the tackifier may be present in an amount up to about 50% by weight, such as from about 15% to about 45% by weight, such as from about 25% to about 35% by weight.

As described above, the adhesive composition may also contain an extensible polymer. An extensible polymer may be added to the adhesive composition in order to provide toughness and stretchability. When present, the extensible polymer may be present in an amount up to about 10% by weight, such as from about 1% to about 7% by weight, such as in an amount of about 5% by weight.

The atactic polymer in the adhesive composition of the invention suitably has a degree of crystallinity of about 30% or less, or a crystallinity of about 20% or less, and a number-average molecular weight of from about 1000 to about 300,000, or from about 3000 to about 100,000. The crystalline polymer in the adhesive composition of the invention has a degree of crystallinity of about 40% or more, or about 60% or more, or about 80% or more, and a number-average molecular weight of from about 3000 to about 200,000, or from about 10,000 to about 100,000. The crystalline polymer may comprise, for instance, an isotactic polymer or a syndiotactic polymer.

The atactic polymer may be the same type of polymer as the crystalline polymer or the atactic polymer may be different from the crytalline polymer. Examples of suitable atactic polymers include atactic polypropylene, low density polyethylene, atactic polystyrene, atactic polybutene, amorphous polyolefin copolymer, and combinations thereof. Examples of suitable crystalline polymers, on the other hand, include isotactic polypropylene, high density polyethylene, isotactic polystyrene, isotactic polybutene, and combinations thereof.

The term "high density polyethylene" (HDPE) is used to refer to polyethylene that is essentially isotactic, while the term "low density polyethylene" (LDPE) is used to refer to polyethylene that is essentially atactic. HDPE generally has a density in a range of about 0.935 to about 0.980 grams per cubic centimeter, while LDPE generally has a density in a range of about 0.910 to about 0.935 grams per cubic centimeter. Examples of suitable atactic polypropylene or ethylene-propylene copolymer (amorphous poly alpha-olefin) are available from Eastman under the trade designations Eastman P1010 and P1023. Examples of suitable isotactic polypropylene are available from Sunoco under the trade designation CP 15000P and from Exxon-Mobil under the trade designation PP 3746G.

The atactic polymer suitably has a thermosel viscosity between about 100 and about 10,000 cps at 190 degrees Celsius as determined using ASTM D 3236, and the isotactic polymer suitably has a melt index between about 50 and about 3000 grams per 10 minutes, as determined using ASTM D 1238, 230° C./2.16 kg Method. The melt index is dependent upon the crystallinity, molecular weight, and molecular weight distribution of the polymers.

In general, any suitable tackifier may be present in the adhesive composition. For example, the adhesive composition may include a high softening point tackifier resin having a softening point of about 80 degrees Celsius or greater, and a viscosity of about 100 cps or greater at 170 degrees Celsius. Examples of suitable high softening point tackifier resins include hydrocarbons derived from petroleum distillates, rosin, rosin esters, polyterpenes derived from wood, polyterpenes derived from synthetic chemicals, as well as combinations of any of these. A commercially available example of a suitable high softening point tackifier is available from Hercules Inc. of Wilmington, Del., under the trade designation PICOLYTE™ S115. PICOLYTE™ S115 has a softening point of 115 degrees Celsius, and viscosity of 10,000 cps at 150 degrees Celsius. Another example of a commercially available high softening point tackifier is ESCOREZ™ 5300 tackifier, available from Exxon-Mobil. ESCOREZ™ 5300 has a softening point of 105 degrees Celsius and viscosity of 3000 cps at 177 degrees Celsius. Another suitable high softening point tackifier, ESCOREZ™ 5320, has a softening point of 122 degrees Celsius, and a relatively low viscosity of 1500 cps at 177 degrees Celsius. Yet another suitable high softening point tackifier, ESCOREZ™ 5415, has a softening point of 118 degrees Fahrenheit, and a lower viscosity of 900 cps at 177 degrees Celsius.

Low softening point tackifiers may be used as well. A low softening point tackifier typically has a softening point below about 80 degrees Celsius and a viscosity of about 100 cps or less at 150 degrees Celsius, while a high softening point tackifier typically has a softening point above about 80 degrees Celsius and a viscosity of about 100 cps or greater at 170 degrees Celsius. The use of predominantly high softening point tackifiers with high viscosity is important for adhesion improvement due to enhanced cohesive strength. However, the inclusion of relatively low amounts of low softening point tackifiers provides instantaneous surface tackiness and pressure sensitive characteristics as well as reduced melt viscosity. A commercially available example of a suitable low softening point tackifier is available from Hercules Inc. of Wilmington, Del., under the trade designation PICOLYTE™ S25. PICOLYTE™ S25 has a softening point of 15-25 degrees Celsius, and a viscosity of 1,000 cps at 80 degrees Celsius. Another suitable low softening point tackifier, also available from Hercules, Inc., is STAYBELITE™ 5, which has a softening point of 79 degrees Celsius. Other suitable low softening point tackifiers are available from Exxon-Mobil under the trade designation ESCOREZ™, namely the 2000 and 5000 series, having a softening point of 80 degrees Celsius or lower.

The extensible polymer may include a high melt flow rate thermal elastomer, having a melt flow rate of at least 10 grams per minute, or between about 10 and about 1,000, or between about 20 and about 500, or between about 50 and about 250 (ASTM D1238 @200° C./5 Kg test method, used for elastomers). The extensible polymer may have a styrene content of between about 0% and about 45%, or between about 18% and about 30%, by weight of the polymer. The extensible polymer may achieve the styrene content either by blending different polymers having different styrene co-monomer levels or by including a single polymer that has the desired styrene co-monomer level. Generally, the higher the styrene co-monomer level is, the higher the tension is.

The extensible polymer may include polystyrene-polyethylene-polypropylene-polystyrene (SEPS) block copolymer, styrene-isoprene-styrene (SIS) block copolymer, styrene-butadiene-styrene (SBS) block copolymer, styrene-ethylene-butene-styrene (SEBS) block copolymer, as well as combinations of any of these. Other suitable extensible polymers include single-site catalyzed polyethylene/octane/polypropylene and/or butane, hexane, polyisoprene, polybutadiene, or ethylene vinyl acetate copolymers, ethylene (methyl) methacrylate copolymers, ethylene n-butyl acrylate copolymers, as well as combinations of any of these or other polymers.

Ethylene vinyl acetate is a particularly suitable extensible polymer, alone or in combination with a high melt flow rate thermal elastomer, for example. More particularly, ethylene vinyl acetate can contribute thermal stability, considerable bond strength, and stretchability to the adhesive compositions. Thermal stability can be measured according to the Adhesive Bulk Aging Test, described in detail below. One example of a suitable ethylene vinyl acetate copolymer is ELVAX 240, available from E. I. DuPont de Nemours located in Wilmington, Del. Another example of a suitable ethylene vinyl acetate copolymer is ESCORENE Ultra ethylene vinyl acetate copolymer UL7510 and 7710 from Exxon-Mobil.

Ethylene methacrylate is another particularly suitable extensible polymer, alone or in combination with a high melt flow rate thermal elastomer, for example. More particularly, ethylene methacrylate is a relatively soft material, which results in an adhesive composition having a reduced modulus. In addition to contributing to the thermal stability, bond strength, and stretchability of the adhesive compositions, ethylene methacrylate is also amphiphilic, which provides improved adhesion to olefinic substrates, such as bonding polyethylene and polypropylene films, or adhesion between dissimilar materials, such as bonding polypropylene spunbond to spandex.

One example of a suitable SEPS block copolymer is available from Kraton Polymers Inc. of Houston, Tex., under the trade designation KRATON G Series. Another example of a suitable SEPS block copolymer is available from Septon Company of America, of Pasadena, Tex., under the trade designation SEPTON 2002. One example of a suitable SIS block copolymer is available from Dexco, a division of Exxon-Mobil, under the trade designation VECTOR. Another example of a suitable SIS block copolymer is available from Kraton Polymers Inc. under the trade designation KRATON D copolymer. Another example of suitable extensible polymers is available from Dow Chemical Co., of Midland, Mich., under the trade designation ENGAGE, particularly the ENGAGE 8400 series.

The extensible polymer may have a Shore A hardness of between about 20 and about 90, or between about 30 and about 80. Shore A hardness is a measure of softness, and can be measured according to ASTM D-5.

In one embodiment of the invention, the extensible polymer may have a melt flow rate between about 10 and about 1000 grams per 10 minutes, or between about 20 and about 500 grams per 10 minutes, or between about 20 and about 500 grams per 10 minutes (ASTM D1238 @200° C./5 Kg test method, used for elastomers), Shore A hardness between about 20 and about 70, and may be stretched up to about 1300%, or between about 100% and about 1200%, or between about 200% and about 1000%, or between about 300% and about 800%.

Other additives that may be present in the adhesive composition include an antioxidant or anti-oxidizing agent, color pigment, filler, polymer compatibilizer, and/or mineral oil or other viscosity modifiers. The adhesive composition may include any one or more of these additives. An antioxidant may be included in the adhesive composition in an amount between about 0.1% and about 1.0% by weight of the composition. One example of a suitable antioxidant is available from Ciba Specialty Chemicals under the trade designation IRGANOX™ 1010. Examples of suitable color pigments and fillers include $TiO_2$, carbon black, and calcium carbonate. The adhesive composition may include about 1% to about 10% by weight color pigments and/or fillers. Examples of suitable polymer compatibilizers include polypropylene-b-polyethylene, polypropylene-b-polybutene diblock copolymers. The adhesive composition may include about 2% to about 10% by weight polymer compatibilizer. The adhesive composition may also include between about 0% and about 20% viscosity modifier, such as mineral oil.

The formulated adhesive compositions provide adhesive stretchability and toughness at use temperatures while maintaining melt processability with viscosity in a range of about 1,000 to about 8,000 cps, or about 2,000 to about 6,000 cps at temperatures between 170 and 180 degrees Celsius.

The adhesive composition, if desired, can be formulated to have stretching capabilities of between about 100% and about 1200%. When combined with the elastomeric material to form the elastic member, such as the continuous filaments as shown in FIG. 1, the adhesive composition can be formulated so that the resulting elastic member is either tacky or non-tacky. For instance, the tackiness of the elastic member and the length of time the elastic member remains tacky can depend upon various factors including the amount of tackifier present in the adhesive composition and the crystallinity of the crystalline polymer. For instance, the greater level of crystallinity of the crystalline polymer, the shorter amount of time that the adhesive composition remains tacky.

The amount the adhesive composition is present in the elastic member, such as the continuous filaments, can vary widely depending upon the particular application and the desired result. For example, the adhesive composition may be present in the elastic member in an amount from about 2.5% to about 20% by weight or greater. For example, the adhesive composition may be present in the elastic member in an amount from about 5% to about 15% by weight.

Of particular advantage, the present inventors have discovered that once the adhesive composition is combined with the elastomeric material and extruded together, the adhesive composition migrates to the surface of the resulting elastic member, such as the continuous filaments shown in FIG. 1. Because the adhesive composition migrates to the surface, the continuous filaments can be formed so as to have a sheath/core construction. Specifically, the elastic filaments can comprise a core formed from the elastomeric material and a sheath formed from the adhesive composition. Depending upon various factors including the amount of adhesive composition present in the filaments, the adhesive composition can make up the entire outer surface of the filaments or can appear only at certain locations on the surface of the filaments.

Because the adhesive composition is present on the surface of the filaments, the adhesive composition is available for bonding to one or more facing materials without adding any other additional adhesives. For example, as shown in FIG. 1, the continuous filaments may be combined at a nip with various types of facings. The facings, for example, may comprise nonwoven fabrics, woven fabrics including knitted fabrics, films, laminates, and the like. In the embodiment depicted in FIG. 1, a first non-woven spunbond facing 22 and a second non-woven spunbond facing 24 are combined on opposing surfaces of the continuous filaments to form a bonded laminate 25. In some embodiments, only one facing may be used, and in other embodiments it is possible to combine the elastic continuous filaments with three, four, or more layers of facing material.

The manner in which the continuous filaments 14 are bonded to the facing materials 22 and 24 can depend upon various factors including the components used to produce the adhesive composition and the amount of adhesive composition present in the filaments. In general, some form of energy such as pressure, temperature, or the like may be used to cause bonding to occur between the filaments and the facing materials. For instance, if the filaments 14 are tacky or sticky, the nip rollers 19 and 20 may only need to supply sufficient pressure to cause bonding to occur. In other embodiments, however, in addition to applying pressure, the nip rollers may be configured to apply some other type of energy, such as thermal energy or ultrasonic energy in order to create bonds between the filaments and the facing materials. For instance, in one embodiment, the nip rollers 19 and 20 may comprise heated rollers for thermally bonding the filaments 14 to the first facing 22 and the second facing 24. For example, in one embodiment, the nip roller 19 and/or the nip roller 20 may be heated to a temperature of from about 60° C. to about 160° C., such as from about 60° C. to about 110° C., such as from about 60° C. to about 100° C. during the thermal bonding process. In other cases of extremely high production speeds, temperature exceeding 160° C. may be used depending on the substrate melting point, line speed, bond pattern surface area, and other factors.

One additional advantage to coextruding the adhesive composition with the elastomeric material to form the continuous filaments is that the continuous filaments can be bonded to the facing materials at any desired location by activating the adhesive material in the locations where bonding is desired. In this regard, the continuous filaments can be bonded to the facing materials according to a pattern. For example, nip roller 19 can comprise an embossing roller that bonds the continuous filaments to the facing material according to a desired pattern. The embossing roller can emboss and bond the filaments to the facing materials using, for instance, heat, pressure, ultrasonic energy, and the like.

Having the capability to bond the filaments to the facing materials according to a pattern can result in a product having improved properties. For example, by only bonding the filaments to the facing materials at particular locations, the softness and flexibility of the product may be increased. Further, the laminate may have improved elastic properties. Also, as will be described in more detail below, by bonding the filaments to the facing materials according to a pattern can produce products having aesthetically pleasing appearances.

In general, any suitable pattern may be used to bond the filaments to the one or more facing materials. The pattern, for instance, may be a reticulated pattern, such as a grid, or may comprise a pattern of discrete shapes. When bonding the filaments to the facing materials according to a pattern, the surface area of the resulting laminate may contain from about 5% to about 90% bond areas, such as from about 10% to about 80% bond areas, such as from about 30% to about 60% bond areas. In one particular embodiment, for instance, the bond areas may comprise from about 35% to about 45% bond areas, such as about 40% bond areas.

Figure 6:
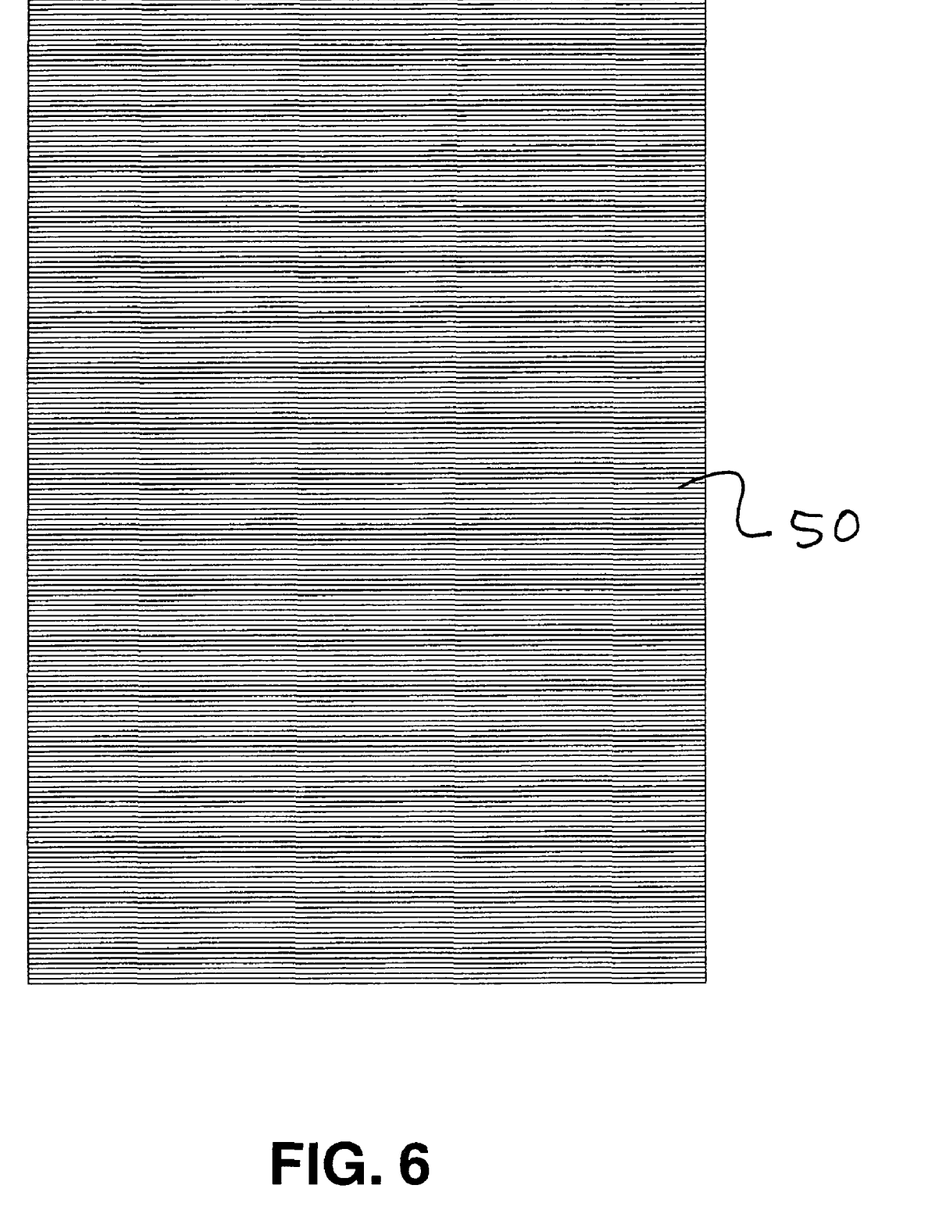
FIG. 6 is one embodiment of a bond pattern that may be used in accordance with the present disclosure.

As stated above, any suitable pattern may be used to bond the filaments to the facing materials. In one particular embodiment, the pattern may comprise a plurality of parallel bond lines in the cross machine direction. For instance, referring to FIG. 6, one embodiment of a bond pattern 50 comprising a plurality of parallel bond lines is shown.

Figure 7:
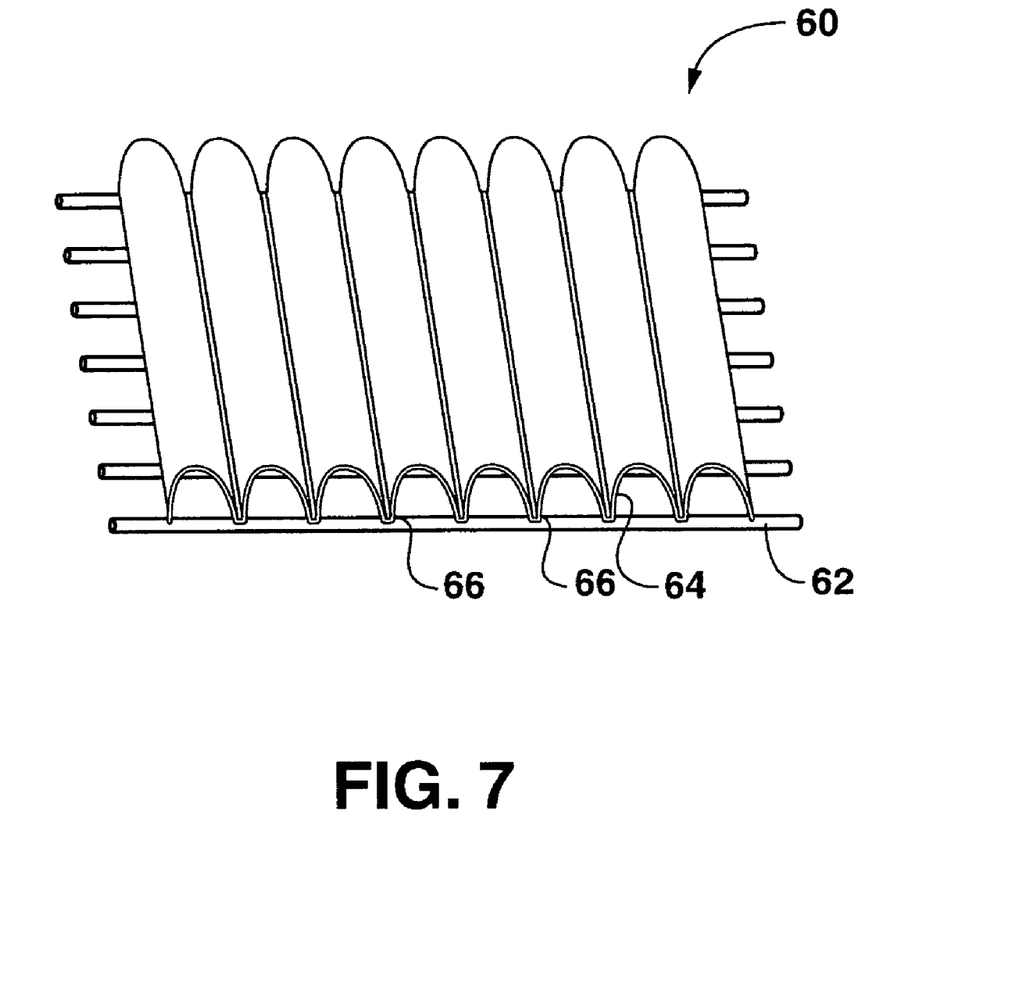
FIG. 7 is a perspective view of one embodiment of an elastic composite material made in accordance with the present disclosure.

Thus, in this embodiment, the filaments are bonded to the facing materials in generally the same location which can create a product having uniform stretch properties. Once the filaments are bonded to the facing materials and relaxed, the facing materials gather. For example, referring to FIG. 7, one embodiment of an elastic composite material 60 made in accordance with the present disclosure is illustrated. As shown, the composite material 60 includes a plurality of elastic filaments 62 bonded to a facing material 64. The filaments 62 are bonded to the facing material 64 according to a plurality of parallel bond lines 66. The facing material 64 gathers in between the parallel bond lines 66 forming a product having a corrugated appearance. Thus, the appearance of the product may be improved. Further, the corrugated structure, in some applications, may feel softer to a consumer. When bonding the filaments according to parallel bond lines, the bond lines may be spaced apart at a distance of from about 0.5 mm to about 10 mm, such as from about 1 mm to about 7 mm, such as from about 2 mm to about 5 mm.

In the embodiment illustrated in FIG. 1, the nip rollers 19 and 20 are located where the three components that comprise the resulting laminate are brought together. As described above, the nip rollers 19 and 20 not only serve as a location for bringing the different materials together but also serve to assist in bonding the continuous filaments to the facing materials. It should be understood, however, that in other embodiments, the bonding of the elastic filaments to the facing materials may occur at different locations. For example, in an alternative embodiment, nip rollers that supply heat and/or ultrasonic energy to the laminate may be located downstream from the nip rollers 19 and 20.

In still another embodiment of the present disclosure, a second pair of nip rollers may be located upstream from nip rollers 19 and 20. The second pair of nip rollers may be used to apply pressure to the elastic filaments for flattening the filaments prior to bonding with the facing materials. Flattening the filaments creates greater surface area for later bonding to the facing materials.

When flattening the filaments, for instance, sufficient pressure and/or heat may be applied to the filaments so that the filaments have a width of from about 0.203 mm to about 5.00 mm and have a thickness of from about 0.203 mm to about 3.00 mm.

After the adhesive composition is coextruded with the elastic material to form the continuous filaments and the continuous filaments are bonded to the nonwoven webs 22 and 24 in a stretched state, the resulting laminate is relaxed causing the nonwoven webs to gather. As shown in FIG. 1, a takeup roll 21 may be employed for receiving and winding the bonded nonwoven material/continuous filament/nonwoven material laminate 25 for storage.

FIG. 2 illustrates a side view of the VFL assembly, including support frame 26 upon which the various components of the system are secured. Reference numerals are employed throughout the figures consistently to indicate the same components in the various views. As shown in FIG. 2, first outer facing roll 27 and second outer facing roll 28 provide the desired facings 22 and 24 to the assembly. Support strut 29 holds the nip roller 20 in place. The rollers can be seen in side view transferring the continuous filaments downward to the nip, where the filaments combine with the facings to form a bonded laminate.

Construction of the continuous filaments 14 will now be described in greater detail including the manner in which the filaments are stretched prior to being bonded to the nonwoven facings in accordance with the present disclosure. As shown in FIGS. 1 and 2, an elastomeric material and adhesive composition is extruded through a die head for initially forming the filaments.

Figure 4:
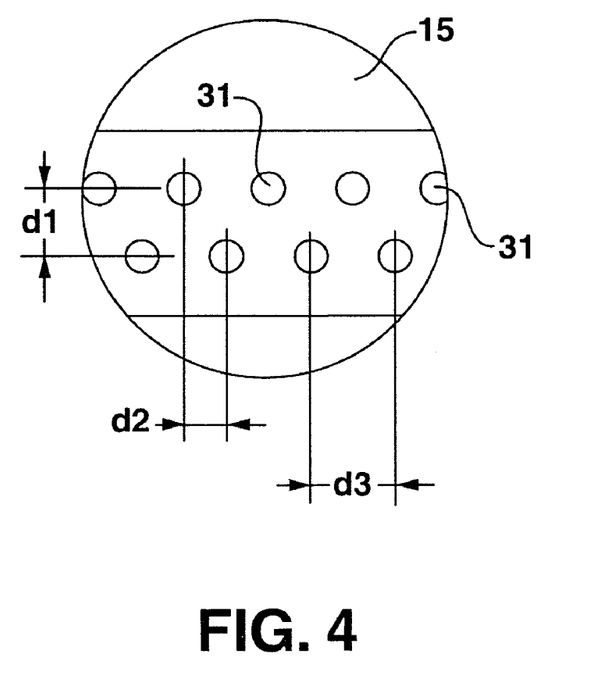
FIG. 4 is a magnified view of a portion of the surface illustrated in FIG. 3.
Figure 5:
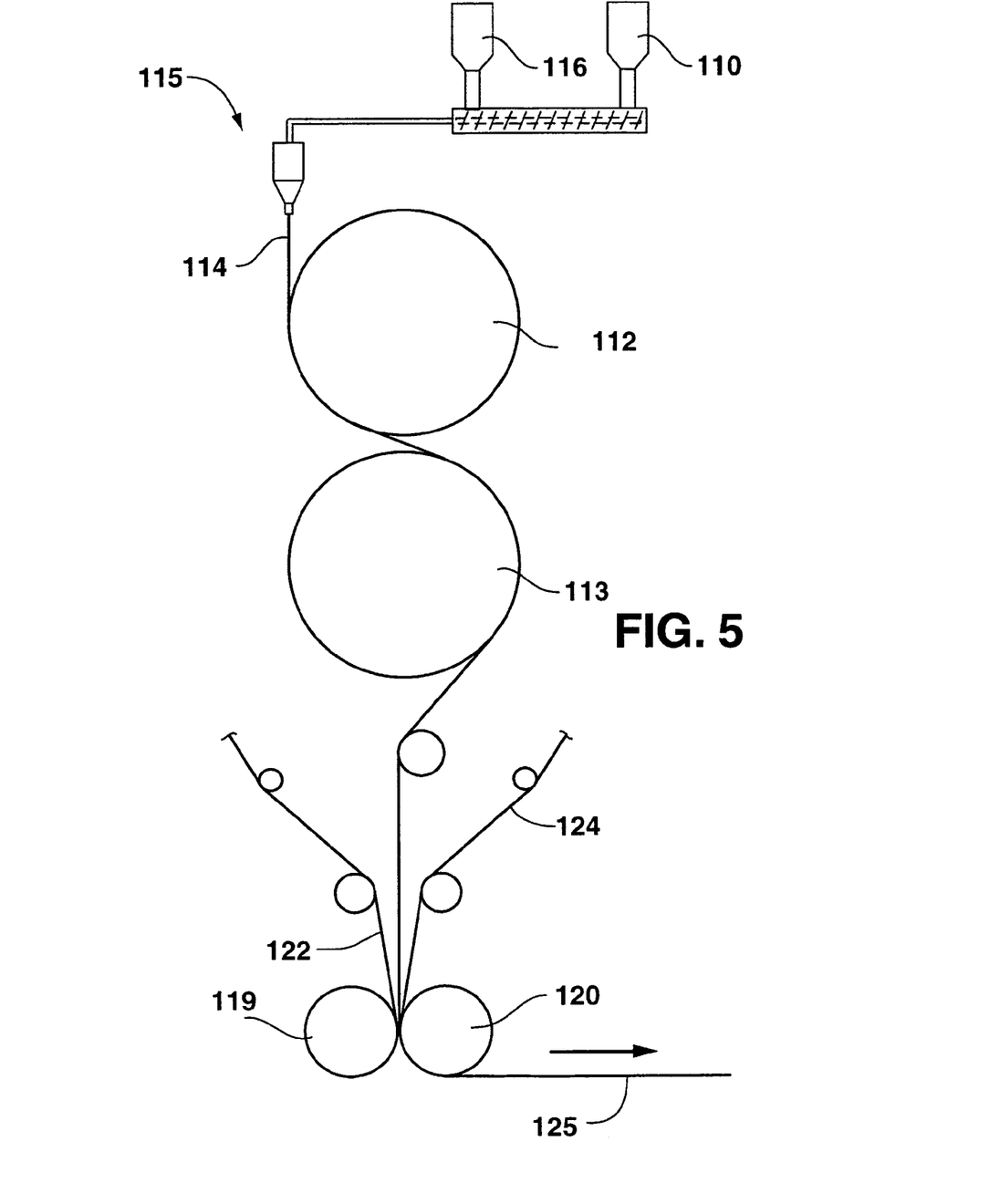
FIG. 5 is a side view of another embodiment of a process that may be used to form composite nonwoven materials in accordance with the present invention.

FIG. 4 depicts an exemplary extruder die head 15 with capillary holes 31. In FIG. 5, a close-up view of the die head is depicted. The pattern and diameter of the capillary holes on the extruder die head may be varied to provide filaments, with the appropriate spacing, without having to utilize expensive combs, etc., to form a fabric having the correct elastic geometry. The distances d1 (distance between rows of capillary hole centers), d2 (distance between contiguous diagonal capillary hole centers on opposing rows) and d3 (distance between contiguous capillary hole centers in the same row) may be varied, depending on the particular features desired in the final products. For example, various hole densities may be utilized in the present process. In a 12-filament/inch example, the distance between center lines of the die holes (d1) may be approximately 2.12 millimeters. When a hole density of 18-filaments/inch is utilized, the distance between die hole center lines (d1) is approximately 1.41 mm.

The rollers that carry the continuous filaments are positioned and operated so as to cause the continuous filaments to be stretched as they vertically flow through the lamination system. When a number of rollers are employed, each successive roller turns in a direction opposite to the immediately preceding roller so that the strands of continuous filaments are handed off from roller to roller. In addition, the speed of each successive roller may be varied from the preceding roller so as to obtain the desired stretching and elongation characteristics. For example, any particular roller may operate at between 1 to 10 times, and more, the speed of any preceding roller. Typically, a separate controller, such as a servomotor or a Turner drive, may be utilized to allow individual speed control for each roll and will drive each individual roll. When the speed is varied, successive rollers may turn at a faster rate to stretch or elongate the strands as they move downwardly in the vertical process. In addition, the continuous filaments are ultimately reduced to a fiber size of approximately 0.203 mm to 1.02 mm in diameter, and in some cases to approximately 0.381 mm to 0.508 mm in diameter.

The number of separate rollers used to convey the continuous filaments to the bonding location may vary depending on the particular attributes desired in the final product. In one particular embodiment, at least four rollers—a first chilled (or positioning) roller, a second chilled roller, a third unchilled roller, and a fourth unchilled roller—may be utilized. In another embodiment, only one chilled roller may be needed before the continuous filaments are supplied to the laminator portion of the system which bonds the spunbond facing(s) to the continuous filaments in a roller nip.

In certain embodiments, the rollers may be plasma coated to provide good release properties. In other embodiments, the rollers may additionally be grooved or channeled to ensure that the extruded continuous filaments maintain a proper separation between individual filaments as the filaments pass over the surface of the rolls and flow through the system. In some embodiments, smooth rolls may be used for one or all of the rolls. In the case where plasma-coated rolls are employed, the continuous filaments will not slip as much as they do on smooth, uncoated rolls. The plasma-coatings grips the strands and promote increased uniformity of distances between the continuous filament strands.

As suggested, any or all of the rollers may be chilled so as to more quickly quench, or harden, the continuous filaments as they are proceeding through the process. The chilled rolls may be chilled to a controlled temperature of between about 5° C. and about 15° C. (typically about 7° C. or about 10° C.). The above temperature range, however, is merely exemplary and, for instance, in other embodiments the chilled rolls may be at a temperature greater than about 20° C. Simultaneous quenching and stretching may be optimized depending on the particular stretchability characteristics desired in the final product.

In one particular embodiment, the series of rollers (or roller) may be enclosed within a sealed tower structure and conditioned air, with the moisture removed, may be utilized in order to control the chilling effects of the rollers. For example, the chilled rolls may be chilled to 50° F. or less relative to the controlled dewpoint. In such cases, the temperature to which the rolls are chilled may be significantly less than 50° F., but with the conditioned air environment, the rolls may remain at 50° F.

Other various mechanisms may be utilized to quench the continuous filaments. For example, external air can be forced onto the fibers in order to control the hardening of the fibers. In other embodiments, one large roll could be used with sufficient surface area in order to quench the fibers.

Maintaining a certain roller speed allows the appropriate degree of elastic stretch to allow the puckers to form in the final laminate. The positioning chilled roller 12 normally turns at a surface speed in the range of about 3-10 feet per minute ("fpm"), while the first vertically-placed chilled roller turns at about 5 to about 15 fpm. The next roller turns at about 7 fpm to about 18 fpm, while the last roller, when applied and used, turns at a speed of about 12 fpm to about 100 fpm. These ranges are approximate, and can vary depending upon the conditions and final product configuration desired.

In one particular embodiment, the first roll may turn at approximately 5 fpm; the second roll at approximately 6 fpm; the third roll at approximately 11 fpm; and the fourth roll at approximately 26 fpm. Another embodiment utilizes a first roll speed of 10 fpm; a second roll speed of 20 fpm; a third roll speed of 40 fpm; and a fourth roll speed of 80 fpm. In this embodiment, the speed of the nip rollers is approximately 75 fpm. In a further embodiment, the speed of the first chilled roll may be approximately 400 fpm; the speed of subsequent rolls may be approximately 750 fpm to stretch the continuous filaments; the speed of the composite material being formed at the nip rollers may be approximately 1500 fpm; and the winding roller speed (to allow relaxation and, thus, gathering of the spunbond facings) may be approximately 700 fpm.

After passing through the series of rollers and becoming stretched, the continuous filaments are then bonded as described above to the nonwoven materials 22 and 24. The nonwoven materials 22 and 24 may be any suitable webs or laminates, including meltblown nonwoven webs, spunbond nonwoven webs, carded webs or even woven webs. In one particular embodiment, a polypropylene spunbond facing having a basis weight of approximately 13.56 gsm may be employed.

The bonder, or nip roll, (sometimes referred to as "laminator") section of the laminating apparatus performs the primary stretching on the continuous filaments. The speed ratio of the bonder or nip rolls relative to the chilled rolls can be varied, and in most cases is between about 2:1 and 8:1 and in some is approximately 4:1 to 6:1.

After bonding of the facing(s) to the continuous filaments to form a spunbond/elastomeric continuous filament/spunbond laminate, the laminate is then allowed to relax and contract to an unstretched or less stretched, condition. The laminate is then wound onto the take-up roll 21 via a surface driven winder. The speed ratio of the winder relative to the bonder rollers results in relaxation of the stretched continuous filaments and a retraction of the laminate into a gathered state as the laminate is wound onto the roll. For example, the winder speed to bonder roll speed may be approximately 0.3 to about 1.0, and may be from about 0.5 to 1.0. The contraction of the continuous filaments results in a gathered, stretchable laminate article where the outer facing(s) is gathered between the bonding points.

The overall basis weight of the laminate can vary, but in some applications is between about 60 gsm and about 140 gsm. In one particular embodiment, the basis weight is between about 2.85 and about 3.2 oz/yd$^2$.

Referring to FIG. 5, an alternative embodiment of a process for producing laminates in accordance with the present invention is shown. In this embodiment, the VFL system 111 is also vertically configured. As stated above, however, horizontally configured systems are equally applicable to the present invention.

As shown in FIG. 5, an extruder 110 is mounted for extruding continuous molten filaments 114 containing an elastomeric material and an adhesive composition downward from an extrusion die 115 at a canted angle onto chilled positioning roller 112. As described above, the adhesive composition may be combined with the elastomeric material and fed to the extruder 110 at the same location. Alternatively, as shown in FIG. 5, the adhesive composition may be fed to the extruder at a port 116 downstream from where the elastomeric material is fed to the extruder.

Chilled positioning roller 112 ensures proper alignment through the remainder of the system as it spreads the filaments. As the filaments travel over the surface of chilled positioning roller 112, they are cooled and solidified as they travel towards and over the chilled surface of chilled roller 113. The filaments then travel downward towards the laminator section of the system comprising a nip formed by a nip roller 119 and a nip roller 120.

The continuous filaments are combined at the nip with various types of facings using any suitable bonding method. In the embodiment depicted in FIG. 5, a first nonwoven spunbond facing 122 and a second nonwoven spunbond facing 124 are combined on opposing surfaces of the continuous filaments to form a bonded laminate 125.

In the embodiment illustrated in FIG. 5, only two chill rolls are used as opposed to the greater number of chill rolls shown in FIG. 1.

The present invention may be better understood with respect to the following example.

EXAMPLE

The following example was performed in order to demonstrate the ability to coextrude an adhesive composition with an elastomeric material in order to form an elastic member that may be stretch bonded to one or more facing materials without the need for any further adhesive layer.

In the following example, elastic filaments were made from a KRATON G Series triblock copolymer obtained from Kraton Polymers, Inc. of Houston, Tex. The G Series KRATON polymer contained 20% tackifier. Elastic filaments were also made from a KRATON G Series tetrablock copolymer containing no tackifier. In addition, the elastic filaments contained an adhesive composition in accordance with the present disclosure. More particularly, the KRATON triblock copolymer was combined with 5% by weight adhesive composition, while the KRATON tetrablock copolymer was combined with the adhesive composition in an amount of 15% by weight.

The adhesive composition used in this example was obtained from the Huntsman Corp. and contained (compounded together) 49.5% H2115 REXTAC atactic polypropylene obtained from Huntsman, 15% by weight PP3746G isotactic polypropylene obtained from the Exxon-Mobil, 30% by weight ESCOREZ 5300 tackifier also obtained from the Exxon-Mobil, 5.0% by weight SEPTON 2002 styrene-ethylene propylene-styrene block copolymer obtained from Huntsman, and 0.5% by weight IRGANOX 1010 antioxidant obtained from Ciba. The adhesive composition came in the form of beads or pellets and was combined with the elastomeric material also in the form of beads or pellets and coextruded through an extruder.

A single screw extruder was used having a Zone 1 temperature of 138° C., a Zone 2 temperature of 193° C., a Zone 3 temperature of 202° C., a Zone 4 temperature of 210° C., a hose temperature of 213° C., and a die temperature of 215° C. The filaments were extruded through a uniform fiber depositor that was 10 inches wide and had twelve holes per inch. The filaments were directed onto a chilled roll at 5 fpm. The elastic strands were stretched horizontally (as opposed to vertically as shown in the figures) at 2-6× speed differential to a thermal embossing nip running at 10-30 fpm. The facing materials laminated to the elastic filaments comprised spunbond webs made from polypropylene having a basis weight of 0.4 osy.

Sixteen samples were produced in which the filaments were laminated to a single facing material or to two facing materials. Eleven samples were made with the triblock elastomer, while five samples were made using the tetrablock elastomer. During extrusion, it was noted that the adhesive composition migrated to the surface of the resulting elastic filaments. Because the adhesive composition migrated to the surface, the filaments had a sheath/core construction and the adhesive composition was present on the surface of the filaments to assist in bonding the filaments to the facing materials. The following is further description of the samples produced.

| Sample | Elastomer | Chill Roll Speed fpm | Elastic Strand Basis Weight gsm | Stretch Level % elongation | Nip Speed fpm | Wind Speed fpm | Single or Double Facing |
|---|---|---|---|---|---|---|---|
| 1 | triblock | 5 | 18.01 | 230 | 16.5 | 10.1 | Double |
| 2 | triblock | 5 | 29.71 | 100 | 10 | 8.0 | Double |
| 3 | triblock | 5 | 36.01 | 230 | 16.5 | 9.9 | Double |
| 4 | triblock | 5 | 23.77 | 400 | 25 | 15.0 | Double |
| 5 | triblock | 5 | 19.81 | 500 | 30 | 18.0 | Double |
| 6 | triblock | 5 | 72.02 | 230 | 16.5 | 9.9 | Double |
| 7 | triblock | 5 | 47.53 | 400 | 25 | 15.0 | Double |
| 8 | triblock | 5 | 39.61 | 500 | 30 | 18.0 | Double |
| 9 | triblock | 5 | 39.61 | 500 | 30 | 18.0 | Single |
| 10 | triblock | 5 | 22.28 | 300 | 20 | 12.0 | Single |
| 11 | triblock | 5 | 14.85 | 300 | 20 | 12.0 | Single |
| 12 | tetrablock | 10 | 14.85 | 300 | 40 | 24.0 | Single |
| 13 | tetrablock | 10 | 11.88 | 400 | 50 | 30.0 | Single |
| 14 | tetrablock | 10 | 23.77 | 400 | 50 | 30.0 | Single |
| 15 | tetrablock | 10 | 23.77 | 400 | 50 | 30.0 | Double |
| 16 | tetrablock | 10 | 35.65 | 400 | 50 | 30.0 | Double |

The horizontal filament laminate process contained a single chilled roll at a temperature of 20° C. During the process, the filaments entered a nip prior to being combined with the facing materials in order to flatten the ribbons. Flattening the filaments increased the surface area of the filaments for bonding to the facing materials. A Teflon™ plasma coated idler roll, approximately 50 mm in diameter, was installed directly onto chilled roll, forming a nip, 50-150 mm after the filament contact onto the chilled roll to smash the filaments into ribbons.

In order to bond the filaments to the facing materials, the different layers were fed into a heated nip containing a heated embossing roll. The embossing roll was at a temperature of 188° F. and the nip produced a bond pressure of 70 psi. The embossing roll produced parallel bond lines in the cross machine direction along the length of the resulting laminate. When the filaments were relaxed, the facing materials produced a corrugated appearance.

The parallel bond lines were produced by installing a plate around an oil heated steel drum. The plate had a width in the cross-machine direction of 20 inches and a length in the machine direction of 38 inches. The plate was made from magnesium and had a thickness of approximately 3 mm. The height of the raised embossing areas was approximately 1.5 to 4 mm. The width of the parallel bond lines in the machine direction was 2 mm and the width of the gap between the parallel bond lines in the machine direction was 3 mm.

All of the samples were successfully produced. Specifically, even though no adhesive layer was present in between the filaments and the facing materials, good bonding was produced between the filaments and the facing materials by coextruding the adhesive composition with the elastomeric material.

The samples had a soft feel and were very flexible.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A composite material comprising:
   at least one facing material;
   at least one elastic member attached to the facing material, the elastic member comprising an elastomeric material combined with an adhesive composition in a sheath and core construct wherein the elastomeric material forms the core of the elastic member and the adhesive composition forms at least a partial sheath around the elastomeric material, and wherein only the adhesive composition in combination with the elastomeric material is present to bond the elastic member to the facing material; wherein
   the adhesive composition comprises an atactic polymer, a crystalline polymer, and a tackifier; and
   the atactic polymer is present in an amount from about 20% to about 80% by weight, the crystalline polymer is present in an amount from about 5% to about 20% by weight, the tackifier is present in an amount from about 20% to about 60% by weight,
   wherein from about 10% to 80% of the surface area of the elastic member is bonded to the facing material; and
   wherein the elastic member has been formed by coextruding the elastic material and the adhesive composition together.

2. A composite material as defined in claim 1, wherein the elastic member has an outside surface and wherein at least a portion of the outside surface comprises the adhesive composition.

3. A composite material as defined in claim 1, wherein the elastomeric material of the elastic member comprises a material selected from the group consisting of a styrenic block copolymer, a polyurethane, a polyester, a polyamide, a copolymer of ethylene and at least one vinyl monomer, or a metallocene-catalyzed polyolefin.

4. A composite material as defined in claim 1, wherein the atactic polymer present in the adhesive composition comprises a material selected from the group consisting of a polypropylene, a polystyrene, a polybutene, a low density polyethylene, or a polyalphaolefin random copolymer and wherein the crystalline polymer present in the adhesive composition comprises a material selected from the group consisting of a polypropylene, a polystyrene, a polybutene, a high density polyethylene, or a polyalphaolefin random copolymer.

5. A composite material as defined in claim 1, wherein the atactic polymer present in the adhesive composition comprises a material selected from the group consisting of a polypropylene, a polyethylene and copolymers thereof and wherein the crystalline polymer present within the adhesive composition comprises a material selected from the group consisting of a polypropylene, a polyethylene and copolymers thereof.

6. A composite material as defined in claim 4, wherein the atactic polymer is less than 25% crystalline and wherein the crystalline polymer is greater than 60% crystalline.

7. A composite material as defined in claim 4, wherein the atactic polymer is less than 20% crystalline and wherein the crystalline polymer is greater than 80% crystalline.

8. A composite material as defined in claim 1, wherein the atactic polymer has a number average molecular weight of from about 3,000 to about 100,000 and the crystalline polymer has a number average molecular weight of from about 10,000 to about 100,000.

9. A composite material as defined in claim 1, wherein the adhesive composition further comprises an extensible polymer, the extensible polymer comprising a material selected from the group consisting of styrene-isoprene-styrene block copolymers, styrene-butadiene-styrene block copolymers, styrene-ethylene butylene-styrene block copolymers, styrene-ethylene propylene-styrene block copolymers, single-site catalyzed polyolefins, polyisoprenes, polybutadienes, ethylene vinyl acetate copolymers, ethylene methacrylate copolymers, ethylene n-butyl acrylate copolymers, and combinations thereof.

10. A composite material as defined in claim 1, wherein the adhesive composition has migrated to a surface of the elastic member.

11. A composite material as defined in claim 1, wherein the adhesive composition is present within the elastic member in an amount from about 2% to about 20% by weight.

12. A composite material as defined in claim 1, wherein the adhesive composition contained within the elastic member is bonded to the facing material according to a pattern, the adhesive composition being thermally bonded or ultrasonically bonded to the facing material.

13. A composite material as defined in claim 12, wherein the bonding pattern comprises parallel bond lines extending in a cross-machine direction.

14. A composite material as defined in claim 1, wherein the facing material comprises a spunbond web or a meltblown web.

15. A composite material as defined in claim 1, wherein the elastic member is attached to the facing material in a stretched state such that the facing material gathers when the elastic member is relaxed.

16. A composite material as defined in claim 1, wherein the elastic member comprises a plurality of filaments.

17. A composite material as defined in claim 1, wherein the elastic member comprises a film or a non-woven web.

18. A composite material as defined in claim 1, wherein the adhesive composition contained within the elastic member is bonded to the facing material according to a pattern, the adhesive composition being bonded to the facing material by pressure bonds.

19. A composite material as defined in claim 1, wherein no other adhesive material is present in between or covering the elastic member.

20. A composite material as defined in claim 1, wherein the elastic member is bonded to the facing material without any additional adhesive layer present in between the elastic member and the facing material.

21. A composite material comprising:
    a facing material;
    elastic filaments extending generally in the same direction, the elastic filaments comprising an elastomeric material combined with an adhesive composition in a sheath and core construct wherein the elastomeric material forms the core of the elastic member and the adhesive composition forms at least a partial sheath around the elastomeric material, the adhesive composition being bonded to the facing material for attaching the elastic filaments to the facing material, the elastic filaments being attached to the facing material in a stretched state such that the facing material gathers when the elastic filaments are relaxed, and wherein the adhesive composition contained within the elastic filaments is bonded to the facing material according to a pattern so as to form bonded areas and non-bonded areas along the length of the filaments; wherein the adhesive composition comprises an atactic polymer, a crystalline polymer, an extensible polymer, and a tackifier, the atactic polymer comprising a material selected from the group consisting of a polyethylene, a polypropylene, or a polyalphaolefin random copolymer, the atactic polymer being present in the adhesive composition in an amount of from about 20% to about 80% by weight, the crystalline polymer comprising a material selected from the group consisting of a polypropylene or a polyethylene, the crystalline polymer being present in the adhesive composition in an amount from about 5% to about 20% by weight, the adhesive composition comprising from about 2% to about 20% by weight of the elastic filaments;

wherein from about 10% to 80% of the surface area of the elastic filaments is bonded to the facing material; and wherein the elastic filaments have been formed by coextruding extruding the elastic material and the adhesive composition together.

22. A composite material as defined in claim 21, wherein the atactic polymer is less than 20% crystalline and wherein the crystalline polymer is greater than 80% crystalline.

23. A composite material as defined in claim 21, wherein the extensible polymer comprises a material selected from the group consisting of styrene-isoprene-styrene block copolymers, styrene-butadiene-styrene block copolymers, styrene-ethylene butylene-styrene block copolymers, styrene-ethylene propylene-styrene block copolymers, single-site catalyzed polyolefins, polyisoprenes, polybutadienes, ethylene vinyl acetate copolymers, ethylene methacrylate copolymers, ethylene n-butyl acrylate copolymers, and combinations thereof.

24. A composite material as defined in claim 21, wherein the adhesive composition contained within the elastic filaments is thermally bonded or ultrasonically bonded to the facing material.

25. A composite material as defined in claim 21, wherein the bonding pattern comprises parallel bond lines that are perpendicular to a filament axis.

26. A composite material as defined in claim 21, wherein no other adhesive layer is present in between or covering the elastic filaments and the facing material.

27. A composite material as defined in claim 21, wherein the composite material comprises a second facing material, the elastic filaments being positioned in between the first facing material and the second facing material.

28. An elastic member comprising an elastomeric material combined with an adhesive composition in a sheath and core construct wherein the elastomeric material forms the core of the elastic member and the adhesive composition forms at least a partial sheath around the elastomeric material wherein the elastomeric material and the adhesive composition have been coextruded together, the adhesive composition having migrated to a surface of the elastic member after being coextruded with the elastomeric material, the elastic member comprising a material selected from the group consisting of a fiber, a filament, a film, or a nonwoven web;

wherein the adhesive composition comprises an atactic polymer, a crystalline polymer, and a tackifier; and wherein the atactic polymer comprises a material selected from the group consisting of a polyethylene, a polypropylene, or a polyalphaolefin random copolymer, the atactic polymer being present in the adhesive composition in an amount from about 20% to about 80% by weight, the crystalline polymer comprising a material selected from the group consisting of a polypropylene or a polyethylene, the crystalline polymer being present in the adhesive composition in an amount from about 5% to about 20% by weight, the tackifier being present in the adhesive composition in an amount from about 20% to about 60% by weight; and wherein from about 10% to 80% of the surface area of the elastic member is bonded to a facing material.

29. An elastic member as defined in claim 28, wherein the adhesive composition further comprises an extensible polymer.

30. A composite material as defined in claim 1, wherein the adhesive composition forms a complete sheath around the elastomeric material.

31. A composite material as defined in claim 21, wherein the adhesive composition forms a complete sheath around the elastomeric material.

32. An elastic member as defined in claim 28, wherein the adhesive composition forms a complete sheath around the elastomeric material.

33. A composite material as defined in claim 1 wherein from about 20% to 60% of the surface area of the elastic member is bonded to the facing material.

34. A composite material as defined in claim 1 wherein from about 35% to 45% of the surface area of the elastic member is bonded to the facing material.

35. A composite material as defined in claim 21 wherein from about 20% to 60% of the surface area of the elastic filament is bonded to the facing material.

36. A composite material as defined in claim 21 wherein from about 35% to 45% of the surface area of the elastic filament is bonded to the facing material.

37. An elastic member as defined in claim 28 wherein from about 20% to 60% of the surface area of the elastic member is bonded to the facing material.

38. An elastic member as defined in claim 28 wherein from about 35% to 45% of the surface area of the elastic member is bonded to the facing material.

* * * * *